United States Patent [19]
Ibuchi et al.

[11] Patent Number: 5,080,010
[45] Date of Patent: Jan. 14, 1992

[54] PRESSURE ROLLER DEVICE

[75] Inventors: Yoshiaki Ibuchi; Mitsuru Ogura, both of Nara, Japan

[73] Assignee: Sharp Kabushiki Kaisha, Osaka, Japan

[21] Appl. No.: 643,089

[22] Filed: Jan. 22, 1991

[30] Foreign Application Priority Data

Sep. 7, 1988 [JP] Japan ................. 63-224165
Sep. 7, 1988 [JP] Japan ................. 63-224166
Oct. 4, 1988 [JP] Japan ................. 63-130297

[51] Int. Cl.⁵ ............................................. B30B 3/04
[52] U.S. Cl. ................................. 100/160; 100/168; 100/171; 100/176; 355/27; 384/610
[58] Field of Search ............ 100/155 R, 160, 168, 100/169, 171, 176; 68/258; 72/242, 248; 355/27, 100, 106; 430/138; 384/610; 118/60, 115, 116

[56] References Cited

U.S. PATENT DOCUMENTS

| | | | |
|---|---|---|---|
| 1,563,130 | 11/1925 | Weston | 100/160 |
| 1,614,424 | 1/1927 | Coe | 100/160 X |
| 2,851,869 | 9/1958 | Quoos et al. | 100/160 X |
| 2,885,954 | 5/1959 | Berlyn | 100/160 |
| 4,343,234 | 8/1982 | Sasaki | 100/158 R |
| 4,727,392 | 2/1988 | Stone et al. | |
| 4,827,312 | 5/1989 | Oginara et al. | 355/27 |
| 4,870,451 | 9/1989 | Hayakawa et al. | 355/27 |
| 4,945,381 | 7/1990 | Yamagata et al. | 355/27 |
| 4,945,382 | 7/1990 | Yui et al. | 355/27 |

FOREIGN PATENT DOCUMENTS

| | | | |
|---|---|---|---|
| 58-88739 | 5/1983 | Japan . | |
| 63-64726 | 3/1988 | Japan | 100/160 |
| 63-70253 | 3/1988 | Japan . | |
| 63-197949 | 8/1988 | Japan . | |
| 531258 | 1/1941 | United Kingdom | 384/610 |
| 994239 | 6/1965 | United Kingdom | 100/160 |

Primary Examiner—Philip R. Coe
Assistant Examiner—Stephen F. Gerrity
Attorney, Agent, or Firm—Sandler, Greenblum & Bernstein

[57] ABSTRACT

A pressure roller device includes upper and lower roller holders and small diameter upper and lower pressure rollers which are supported by the upper and lower roller holders, respectively. Upper and lower backup rollers, which are, respectively, provided at upper and lower sides of the upper and lower pressure rollers, remote from a point of contact of the upper and lower pressure rollers are rotatably supported by the upper and lower roller holders, respectively. The upper roller holder is rotatably supported, at one end of the upper and lower roller holders, by the lower roller holder. A pressing mechanism presses the upper roller holder against the lower roller holder, which is provided at the other end of the upper and lower roller holders, with the upper roller holder being rotated so as to be pressed against the lower roller holder, such that the upper and lower pressure rollers are brought into pressing contact with each other by the upper and lower backup rollers.

15 Claims, 10 Drawing Sheets

PRESSURE ROLLER DEVICE

This application is a continuation of application Ser. No. 07/401,850, filed Sep. 1, 1989, (now abandoned).

BACKGROUND OF THE INVENTION

The present invention relates to a pressure roller device for developing and fixing a formed image by applying a pressure thereto.

For example, Japanese Patent Laid-Open Publication No. 88739/1983 discloses a method in which an image is formed by using a media sheet that is coated with resinous microcapsules containing a photo-setting material, a colorless dye and an image receiving sheet that is coated with a developer for effecting a color development of the colorless dye. When an image forming light, such as light reflected from an original document, is irradiated onto the media sheet, the irradiated microcapsules are set by a reaction of the photo-setting material so that a latent image is formed on the media sheet through s partial setting of the microcapsules. Then, when a pressure is applied to the image receiving sheet and the media sheet is placed on each other, the unset microcapsules are ruptured. Therefore, the colorless dye flows out of the ruptured microcapsules so as to be subjected to color development by the developer of the image receiving sheet, such that a colored image corresponding to the image forming light is formed on the image receiving sheet.

The microcapsules have a minute diameter of about 5 $\mu$m. A high linear pressure of about 90 kg/cm is required to rupture the unset microcapsules. Thus, conventionally, it has been so arranged that the media sheet and the image receiving sheet placed on each other are passed between pressure rollers so as to rupture the unset microcapsules. The quality of the colored image formed by the rupturing of the unset microcapsules is affected by the magnitude and uniformity of the pressure for rupturing the unset microcapsules, etc. In this connection, various pressure rollers have been designed. For example, in U.S. Pat. No. 4,343,234, uniform pressing force is obtained by deflecting each of a pair of rotary shafts for the pressure rollers. The pressing force is increased by employing a depression roller that is in pressing contact with one of the pressure rollers. However, in this known pressure roller device, since an area of pressing contact between the pressure rollers is large, a large pressure is required to be applied in order to increase a pressing force per unit area of pressing contact. Thus, problems arise that a pressing mechanism including a spring, etc. becomes large in size and expensive materials are required to be used.

Meanwhile, in Japanese Patent Laid-Open Publication No. 70253/1988, pressure rollers of a small diameter and at least one pair of backup rollers for pressing the pressure rollers are provided so as to increase the pressing force. However, in this prior art pressure roller device, an axial bending strength of the pressure rollers of a small diameter is low. Furthermore in the case where a plurality of pairs of backup rollers for pressing the pressure rollers are provided, it is difficult to uniformly maintain the pressing force of each of the backup rollers. Hence, it is difficult to uniformly press the media sheet and thus, strain is readily produced in an axial direction of the pressure rollers. In addition, the prior art pressure roller device has a drawback in that a pressing mechanism including a spring, etc. is required to be provided for each of a plurality of pairs of the backup rollers, thereby resulting in a rise of its production cost.

Meanwhile, when the pressure rollers have a diameter of 65 mm, a high linear pressure of about 90 kg/cm is required to rupture the unset microcapsules. In order to obtain this linear pressure in an overall region in the longitudinal direction of the pressure rollers, in the case where, for example, a sheet (A4-size of 21×29.7 cm) is fed sidewise, a load of 2673 kg (i.e., 90×29.7) is required to be applied to the pressure rollers. In order to apply such a large load to the pressure rollers, members for supporting the pressure rollers, for example, a frame, bearings, etc. must have a sufficiently large strength and a device itself for applying the load to the pressure rollers becomes large in size. Therefore, the known pressure roller device becomes large in size, resulting in an increase in its production cost. Furthermore, the known pressure roller device has many inconveniences, such as producing large noises from a rotational transmission mechanism which includes gears for transmitting rotation to the pressure rollers, etc. Moreover, the known pressure roller device is disadvantageous in that an operation for relieving pressure, in the event the of occurrence of a jam at the pressure rollers is quite troublesome. In addition, in the known pressure roller device, a problem arises that since the pressure rollers are required to have a large outside diameter and the pressure rollers are required to be bored in order to apply a uniform load to the pressure rollers, the production cost is increased.

In a pressure image forming device disclosed in Japanese Patent Laid-Open Publication No. 70253/1988 referred to above, the sheets are pressed between upper and lower pressure rollers (a pressing roller and a support roller) of a relatively small diameter, while a pair of upper backup rollers of a relatively large diameter and a pair of lower backup rollers of a relatively large diameter are, respectively, provided at sides of the upper and lower pressure rollers remote from a point of pressing contact therebetween and interpose the upper and lower pressure rollers along the axial direction of the upper and lower pressure rollers so as to urge the upper and lower pressure rollers, respectively by using a pressing mechanism for pressing the upper and lower backup rollers in the pressing directions of the upper and lower backup rollers. By this arrangement of the prior art pressure image forming device, the area of contact between the pressure rollers is reduced, so that the pressing force per unit area of contact between the pressure rollers is increased. Thus, a load applied to the pressing roller can be reduced. As a result, the frame, bearings, pressing mechanism, etc. can be made small in size, noises produced at the rotational transmission mechanism can be lessened and an operation for eliminating jamming of the pressure rollers can be easily performed.

However, in the prior art pressure image forming apparatus, since the pressure rollers are made small in diameter, the rigidity of the pressure rollers drops. Therefore, if a load is applied to opposite end portions of the backup rollers, central portions of the pressure rollers are deflected. Thus, a gap is produced between a pair of the pressure rollers at the central portions of the pressure rollers. Therefore, since a uniform pressure cannot be obtained along the longitudinal direction of the pressure rollers, a problem arises in that the colored image on the image receiving sheet has nonuniform density. In addition, the sheets are undesirably wrinkled by the deflection of the pressure rollers.

Furthermore, in the prior art pressure image forming apparatus, the upper backup rollers and the lower backup rollers interpose the upper and lower pressure rollers, respectively, so as to position the upper and lower pressure rollers. Thus, the upper backup rollers, for example, are disposed so as to form an angle of about 90° relative to the center of the upper pressure roller and interpose the upper backup roller so as to press the upper pressure roller towards the lower pressure roller. Likewise, the lower backup rollers interpose the lower pressure roller so as to press the lower pressure roller towards the upper pressure roller. However, when a high pressure that is sufficient to rupture the unset microcapsules is to be obtained in this prior art pressure image forming apparatus of the above described arrangement the, diameter of the backup rollers should be made large so as to increase the pressing force of the backup rollers. As a result, it is difficult to reduce production costs of the prior art pressure image forming apparatus and make the prior art pressure image forming apparatus compact.

SUMMARY OF THE INVENTION

Accordingly, an essential object of the present invention is to provide a pressure roller device having small diameter pressure rollers, in which the pressure of a pressing mechanism can be lowered through the reduction of an area of contact between the pressure rollers, and where the pressure rollers can be uniformly pressed.

An object of the present invention is to provide a pressure roller device in which not only a uniform pressure can be applied from backup rollers to the pressure rollers along a longitudinal direction of the pressure rollers, but, also the nonuniformity of density in a colored image and production of wrinkles of sheets resulting from a drop of the rigidity of the pressure rollers due to a reduction of the diameter of the pressure rollers can be prevented.

Still another object of the present invention is to provide a pressure roller device whose production cost can be reduced and which can be made compact in size.

In order to accomplish these objects of the present invention, a pressure roller device embodying the present invention comprises: upper and lower roller holders; upper and lower pressure rollers having a small diameter, which are supported by the upper and lower roller holders, respectively; upper and lower backup rollers which are, respectively, provided at upper and lower sides of the upper and lower pressure rollers remote from a point of contact of the upper and lower pressure rollers so as to be rotatably supported by the upper and lower roller holders, respectively; the upper roller holder being rotatably supported, at one end of the upper and lower roller holders, by the lower roller holder; and a pressing mechanism for pressing the upper roller holder against the lower roller holder, which is provided at the other end of the upper and lower roller holders; wherein the upper roller holder is rotated so as to be pressed against the lower roller holder such that the upper and lower pressure rollers are brought into pressing contact with each other by the upper and lower backup rollers.

In the pressure roller device of the present invention, the upper and lower backup rollers supported by the upper and lower roller holders are, respectively, provided at the opposite sides of the point of contact between the upper and lower pressure rollers, namely at upper and lower sides of the upper and lower pressure rollers. The upper roller holder is rotated relative to the lower roller holder. When the upper roller holder has been pressed against the lower roller holder by the pressing mechanism, the upper and lower backup rollers are pressed in directions for pressing the upper and lower pressure rollers against each other and thus, the upper and lower pressure rollers are also pressed against each other by the upper and lower backup rollers. Since the upper and lower pressure rollers have a small diameter, the area of contact between the upper and lower pressure rollers is small. Therefore, even if pressing force of the pressing mechanism is small, a sufficient surface pressure can be obtained.

The upper and lower backup rollers are, supported by the upper and lower roller holders, respectively, and a pressing force is applied to opposite end portions of the upper and lower backup rollers. Therefore, a substantially uniform pressing force is applied to the upper and lower backup rollers along the axial direction of the upper and lower backup rollers. Since the upper and lower backup rollers are directly brought into pressing contact with the upper and lower pressure rollers, respectively, so as to press the upper and lower pressure rollers against each other, the upper and lower pressure rollers are also uniformly pressed against each other along the axial direction of the upper and lower pressure rollers. Therefore, in the present invention, the pressure rollers, which have a small diameter, are not subjected to a bending deformation.

BRIEF DESCRIPTION OF THE DRAWINGS

These objects and features of the present invention will become apparent from the following description taken in conjunction with the preferred embodiments thereof with reference to the accompanying drawings, in which.

Before the description of the present invention proceeds, it is to be noted that like parts are designated by like reference numerals throughout the several views of the accompanying drawings.

DETAILED DESCRIPTION OF THE INVENTION

Figure 3:
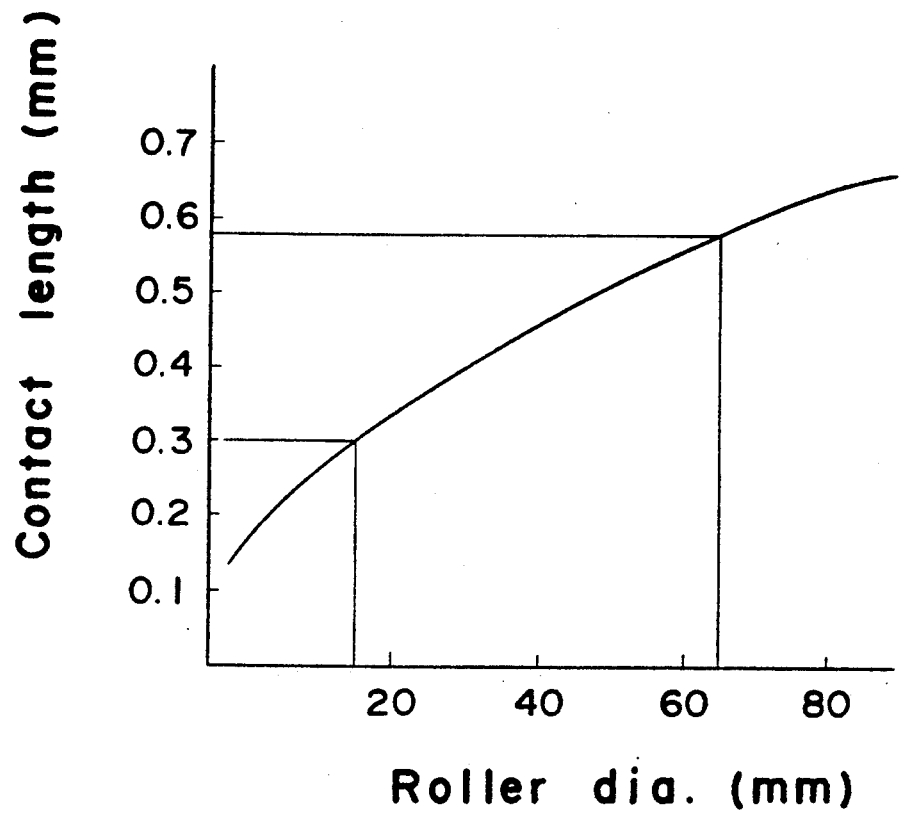
FIG. 3 is a graph showing a relationship between the diameter of pressure rollers and the length of contact of the pressure rollers with a media sheet and an image receiving sheet in the pressure roller device of FIG. 1.
Figure 4:
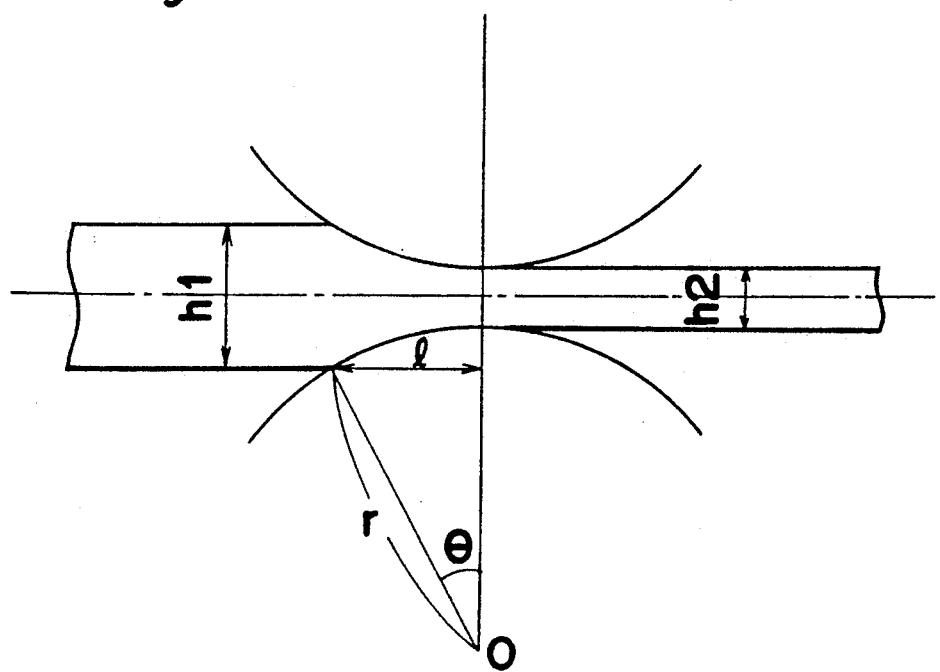
FIG. 4 is a view showing the length of contact of pressure rollers of FIG. 3 with the media sheet and the image receiving sheet.

FIG. 3 shows the relationship between the diameter of pressure rollers and the length of contact of the pressure rollers with a media sheet and an image receiving sheet in a pressure roller device K1 according to a first embodiment of the present invention. Meanwhile, FIG. 4 shows the length of contact of the pressure rollers with the media sheet and the image receiving sheet. In FIG. 4, character h1 denotes a thickness of the media sheet and the image receiving sheet before pressing and character h2 denotes a thickness of the media sheet and the image receiving sheet after pressing. Meanwhile, character r denotes a radius of the pressure rollers, character denotes a length of contact of the pressure rollers with the media sheet and the image receiving sheet and character λ denotes an angle of contact of the pressure rollers with the media sheet and the image receiving sheet. The he length λ of contact of the pressure rollers with the media sheet and the image receiving sheet is expressed by the following equation (1).

$$l^2 = r^2 - (r\cos\theta)^2 \quad (1)$$
$$= r^2 - \{r - (h1 - h2)/2\}^2$$
$$= r(h1 - h2) - (h1 - h2)^2/4$$

Therefore, length λ can be approximated as follows.

$$l = \sqrt{r(h1 - h2)} = \sqrt{r \Delta h} \quad (2)$$

Meanwhile, the thicknesses h1 and h2 approximately assume 120 μm and 110 μm, respectively. By using the above equation (2), FIG. 3 shows the relationship between the diameter of the pressure rollers and the contact length λ.

The pressure rollers in general use have a diameter of about 65 mm. In this case, the contact length λ is about 0.6 mm. However, in case pressure development is actually performed, the contact length λ is not required to be as large as 0.6 mm. Rather, about 0.3 mm is sufficient for the contact length λ. Thus, in order to set the contact length λ at about 0.3 mm, the diameter of the pressure rollers may be set at 20 mm. Thus, the area of contact between the pressure rollers is reduced. Therefore, even if pressure the applied to the pressure rollers is reduced to half that of the pressure rollers which are 65 mm in diameter, a pressing contact pressure identical with that of the pressure rollers of 65 mm in diameter can be obtained. Therefore, in this embodiment, the diameter of the pressure rollers is set at 20 mm. Meanwhile, the diameter of the pressure rollers may be properly set in accordance with the various types of media sheet and image receiving sheet, that are used e.g. the reduction ratio (h2/h1) between the thickness h1 of the media sheet and the image receiving sheet before pressing and the thickness h2 after pressing.

Figure 1:
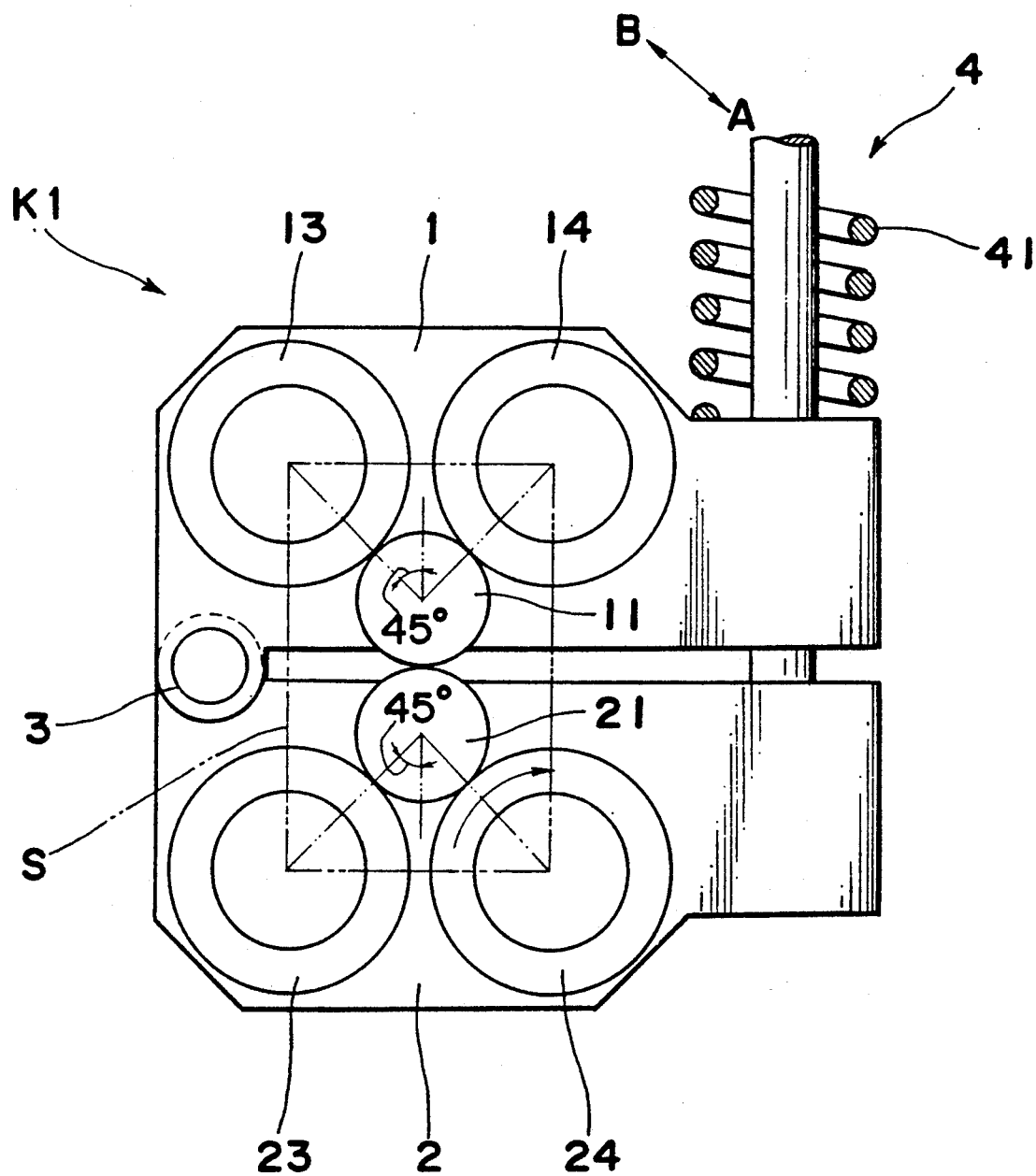
FIG. 1 is a front elevational view of a pressure roller device according to a first embodiment of the present invention.
Figure 2:
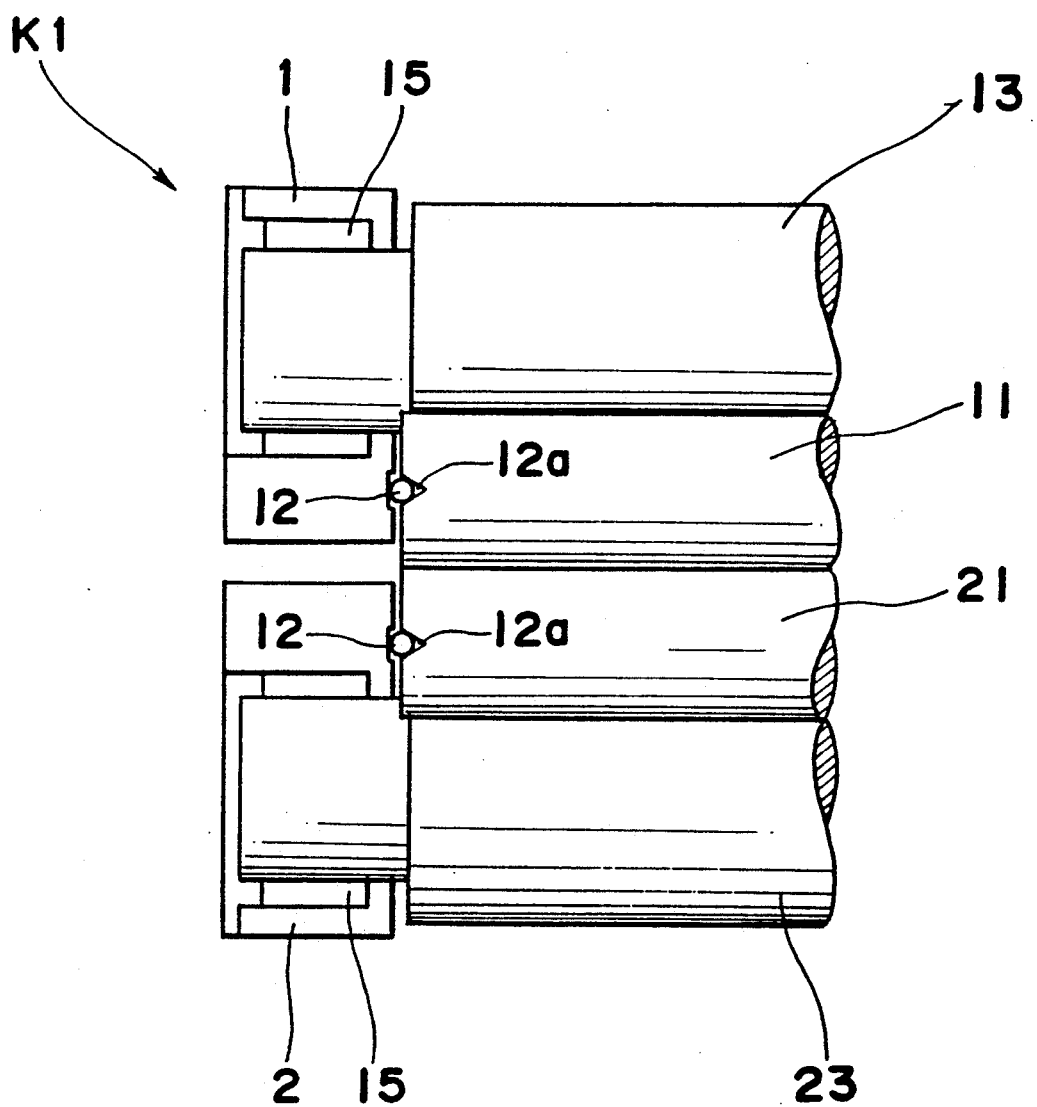
FIG. 2 is a side elevational view of the pressure roller device of FIG. 1.

Referring to FIGS. 1 and 2, there is shown the pressure roller device K1 according to a first embodiment of the present invention. The pressure roller device K1 includes upper and lower roller holders 1 and 2. The upper and lower roller holders 1 and 2 are rotatably supported by a hinge 3 provided at one end of the upper and lower roller holders 1 and 2 so as to be rotated relative to each other about the hinge 3. The lower roller holder 2 is secured to an apparatus housing (not shown) of an image forming apparatus. Thus, the upper roller holder 1 is rotated about the hinge 3 in the direction of arrows A and B so as to be closed and opened relative to the lower roller holder 2. A pressing mechanism 4, for pressing the upper roller holder 1 against the lower roller holder 2, is provided at the other end of the upper and lower roller holders 1 and 2. The pressing mechanism 4 includes a pair of coiled springs 41 that are provided at opposite end portions of upper and lower backup rollers 13, 14 and 23, 24 such that the upper roller holder 1 is pressed against the lower roller holder 2 by the coiled springs 41.

A pair of balls 12 are, respectively, rotatably received in recesses 12a formed on opposite end faces of an upper pressure roller 11, having a diameter of about 20 mm, so as to be brought into contact with opposite inner side faces of the upper roller holder 1, such that the upper pressure roller 11 is rotatably supported at a point by the balls 12. Likewise, a pair of balls 12 are, respectively, rotatably received in the recesses 12a formed on opposite end faces of a lower pressure roller 21, having a diameter identical with that of the upper pressure roller 11, so as to be brought into contact with opposite inner side faces of the lower roller holder 2, such that the lower pressure roller 21 is rotatably supported at a point by the balls 12. Since the upper and lower pressure rollers 11 and 21 are supported at a point by the balls 12, play exists in the support of the upper and lower pressure rollers 11 and 21 on the upper and lower roller holders 1 and 2, so as to set the upper and lower pressure rollers 11 and 21 in a free state. The upper and lower pressure rollers 11 and 21, set in a free state as described above, are accurately positioned by the pair of upper backup rollers 13 and 14 and the pair of lower backup rollers 23 and 24, respectively. Meanwhile, the media sheet, having a latent image formed thereon, and the image receiving sheet are passed between the upper and lower pressure rollers 11 and 21, so as to be pressed against each other, such that the unset microcapsules are ruptured.

The upper backup rollers 13 and 14 are provided at upper portions of opposite sides of the upper pressure roller 11 so as to laterally confront each other and are held in contact with the upper pressure roller 11. The upper backup rollers 13 and 14 grip the upper pressure roller 11 in symmetric obliquely downward directions at an angle of 45° to a vertical line passing through the center of the upper pressure roller 11. Similarly, the lower pressure rollers 21 are provided at lower portions of opposite sides of the lower pressure roller 21, so as to laterally confront each other and are held in contact with the lower pressure roller 21. The lower backup rollers 23 and 24 grip the lower pressure roller 21 in symmetric obliquely upward directions at an angle of 45° to a vertical line passing through the center of the lower pressure roller 21. Therefore, the centers of the upper backup rollers 13 and 14 and the lower backup rollers 23 and 24 are disposed at vertexes of a rectangle S, shown in two-dot chain lines in FIG. 1.

Thus, as will be described later, the upper pressure roller 11 is downwardly pressed by the upper backup rollers 13 and 14, while the lower pressure roller 21 is upwardly pressed by the lower backup rollers 23 and 24. The upper backup rollers 13 and 14 are rotatably supported, through needle bearings 15, by the upper roller holder 1. Likewise, the lower backup rollers 23 and 24 are rotatably supported, through needle bearings 15, by the lower roller holder 2. Although not specifically shown, a gear in mesh with a drive unit is mounted on the lower backup roller 24. It is desirable that the diameter of the upper backup rollers 13 and 14 and the lower backup rollers 23 and 24 be set at about 35 to 45 mm.

With the above-described pressure roller device arrangement the upper roller holder 1 supporting the upper pressure roller 11 and the upper backup rollers 13 and 14 are rotated about the hinge 3 mounted on the lower roller holder 2 so as to be brought into engagement with the lower roller holder 2. Then, when the upper roller holder 1 is downwardly pressed by the pressing mechanism 4, the upper and lower roller holders 1 and 2 are brought into pressing contact with each other. Hence, the upper backup rollers 13 and 14 supported by the upper roller holder 1 and the lower backup rollers 23 and 24 supported by the lower roller holder 2 are subjected to forces oriented in directions for bringing the upper backup rollers 13 and 14 and the lower backup rollers 23 and 24 into pressing contact with each other. Therefore, the upper pressure roller 11 is gripped between the upper backup rollers 13 and 14 so as to be accurately positioned, while the lower pressure roller 21 is gripped between the lower backup rollers 23 and 24 so as to be accurately positioned, such that the upper and lower pressure rollers 11 and 21 are brought into pressing contact with each other.

Since the upper backup rollers 13 and 14 are disposed along the upper pressure roller 11 so as to press the upper pressure roller 11 downward and the lower backup rollers 23 and 24 are disposed along the lower pressure roller 21 so as to press the lower pressure roller 21 upward, nonuniform pressing force is not applied to the upper and lower pressure rollers 11 and 21 and the upper and lower pressure rollers 11 and 21 are not subjected to bending deformation, even if the upper and lower pressure rollers 11 and 21 have a small diameter of about 20 mm. Therefore, nonuniform pressing of the media sheet is prevented.

Figure 5:
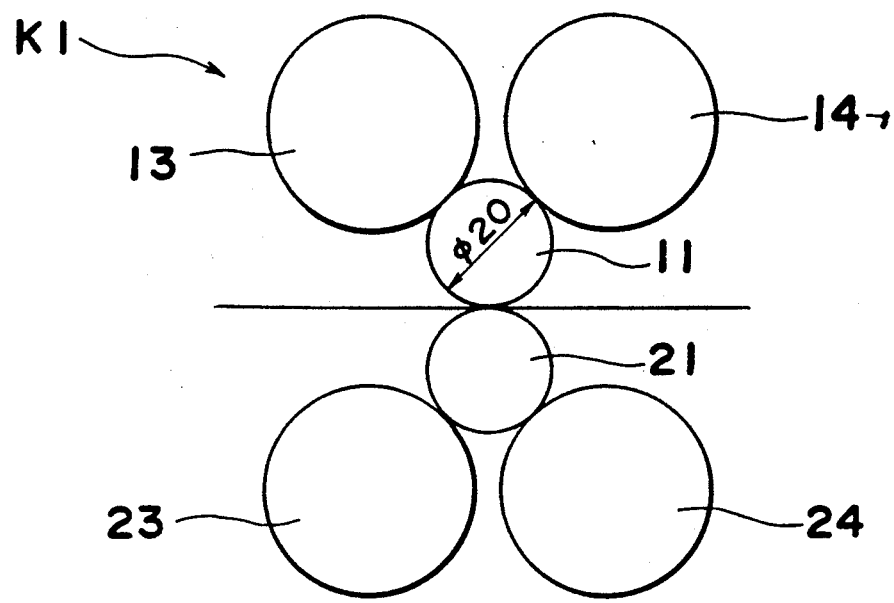
FIG. 5 is a schematic front elevational view of the pressure roller device of FIG. 1.
Figure 6:
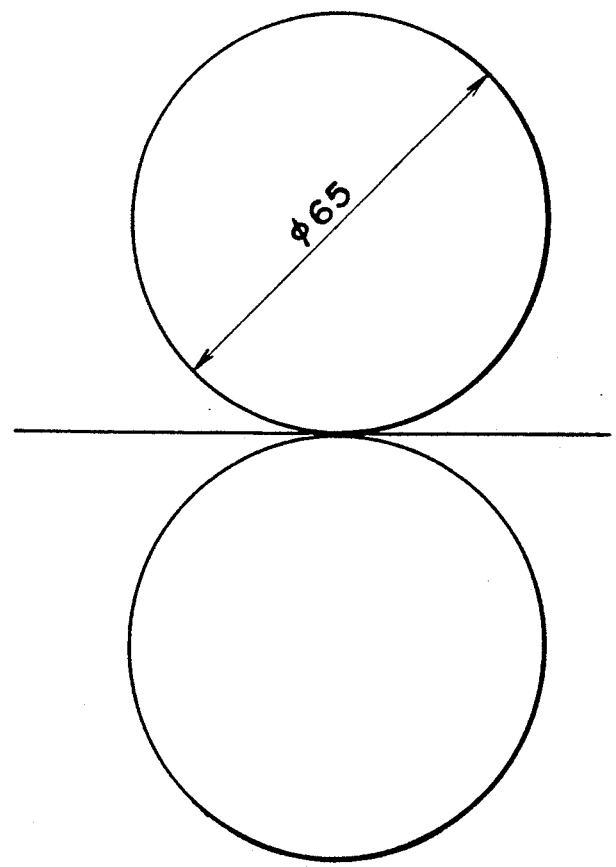
FIG. 6 is a view showing a prior art pressure roller device having a pressing contact pressure identical to that of the pressure roller device of FIG. 5.

FIG. 6 shows a prior art pressure roller device employing pressure rollers having a diameter of 65 mm. FIG. 5 shows the pressure roller device K1 of the present invention. Overall size of the pressure roller device K1 of FIG. 5 is substantially the same as that of the prior art pressure roller device of FIG. 6. However, as compared with the prior art pressure roller device, mechanisms of the pressure roller device K1 such as the pressing mechanism are simplified and a uniform pressing force can be obtained.

As will be seen from the foregoing description, in accordance with the present invention, since a whole pressing force for the pressure rollers can be lessened through the reduction of the diameter of the pressure rollers, the pressing mechanism can be made compact in size and simplified in structure.

Meanwhile, in accordance with the present invention, since the backup rollers are provided along the pressure rollers, rotational strain of the pressure rollers can be eliminated through prevention of production of bending deformation of the pressure rollers having a small diameter.

Figure 9:
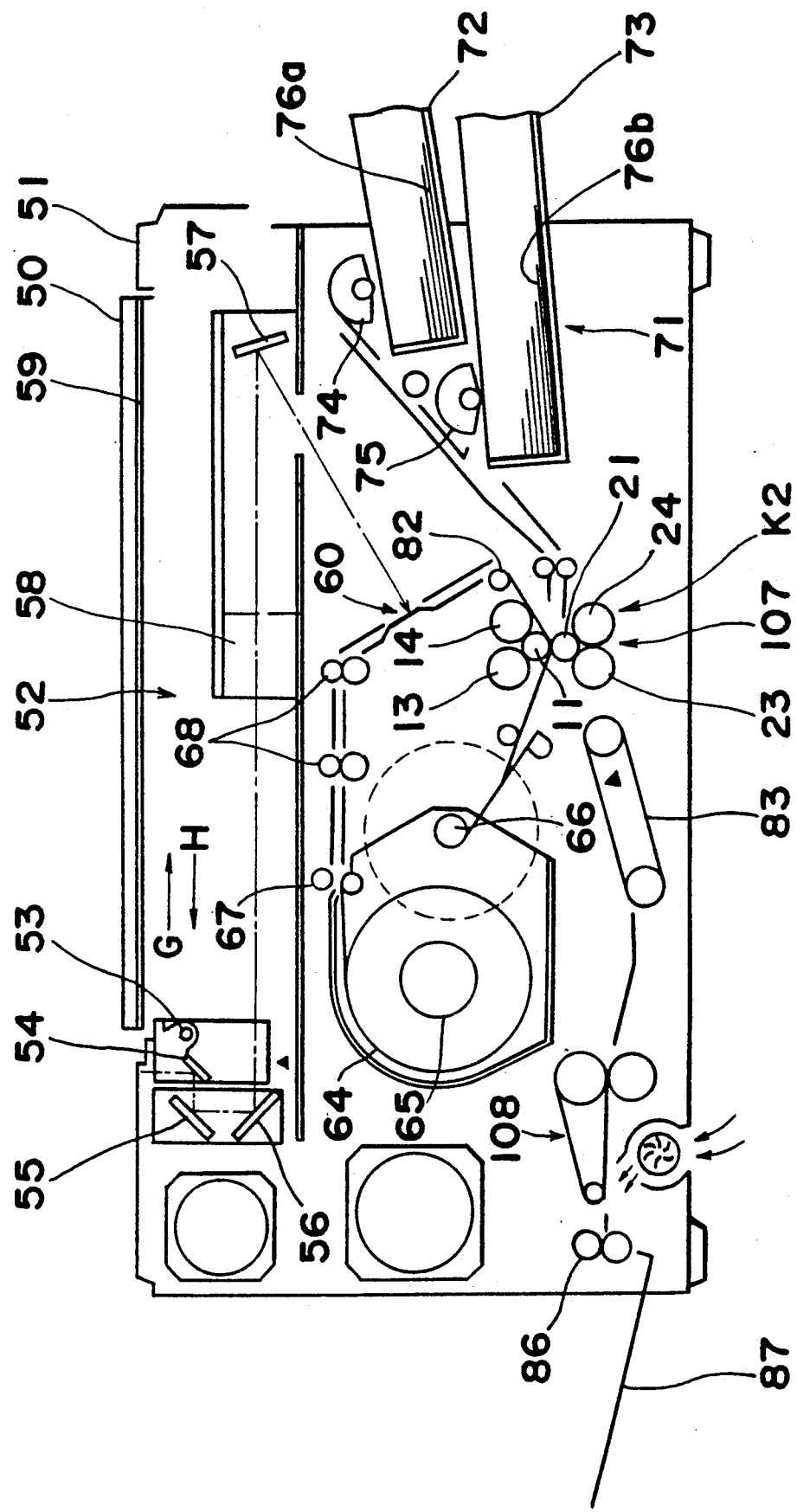
FIG. 9 is a schematic sectional view of an image forming apparatus provided with the pressure roller device of FIG. 7.

Referring to FIG. 9, there is shown an image forming apparatus provided with a pressure roller device K2 according to a second embodiment of the present invention. At a substantially central portion of an apparatus housing 51 of the image forming apparatus, a long media sheet 64 is wound in a rolled form around a supply shaft 65. The media sheet 64 is guided to a pressure transfer portion 107 via rollers 67 and 68, an exposure portion 60 and a roller 82. The pressure transfer portion 107 comprises the upper and lower pressure rollers 11 and 12, the upper backup rollers 13 and 14 and the lower backup rollers 23 and 24. The media sheet 64, having passed through the pressure transfer portion 107, is wound around a take-up shaft 66. It is to be noted that an angle of contact of the upper pressure roller 11 with the media sheet 64 is larger than an angle of contact of the lower pressure roller 21 with the media sheet 64.

First and second paper cassettes 72 and 73 are mounted on one side of the apparatus housing 51 and comprises a paper feeding portion 71 together with first and second paper feeding rollers 74 and 75. Image receiving sheets 76a and 76b, cut to different sizes, are accommodated in the first and second paper cassettes 72 and 73, respectively. Through selective rotation of the first and second paper feeding rollers 74 and 75, either the image receiving sheet 76a or the image receiving sheet 76b is guided to the pressure transfer portion 107. The image receiving sheet 76a or 76b is passed through the pressure transfer portion 107 together with the media sheet 64. Subsequently, the media sheet 64 is wound around the take-up shaft 66, while the image receiving sheet 76a or 76b is discharged to a copy receiving tray 87 by way of a calender 108 and pair of ejection rollers 86.

An original platform 59, formed by transparent hard glass, is provided on an upper face of the apparatus housing 51. An upper face of the original platform 59 is covered by an original cover 50, while an optical system 52 is provided below the original platform 59. The optical system 52 comprises by a light source 53, mirrors 54 to 57 and a lens 58. The light source 53 and the mirrors 54 to 56 reciprocate below the original platform 59 in the direction of arrows G and H, so as to scan, by using light from the light source 53, an original document that is placed on the original platform 59. Light from the light source 53 is reflected from the original document and guided to an exposure portion 60 through the mirrors 54 to 57 and the lens 58, so as to subject the media sheet 64 to exposure such that a selectively set image of photosensitive microcapsules is formed on the media sheet 64. The image receiving sheet 76a or 76b and the media sheet 64, having the selectively set image formed thereon, are pressed against each other by the upper and lower pressure rollers 11 and 21 at the pressure transfer portion 107. Through this pressing performed by the upper and lower pressure rollers 11 and 21, unset photosensitive microcapsules on the media sheet 64 are ruptured, so that colorless dye contained in the photosensitive microcapsules reacts with developer on the image receiving sheet 76a or 76b, such that a colored image is formed on the media sheet 76a or 76b.

Figure 7:
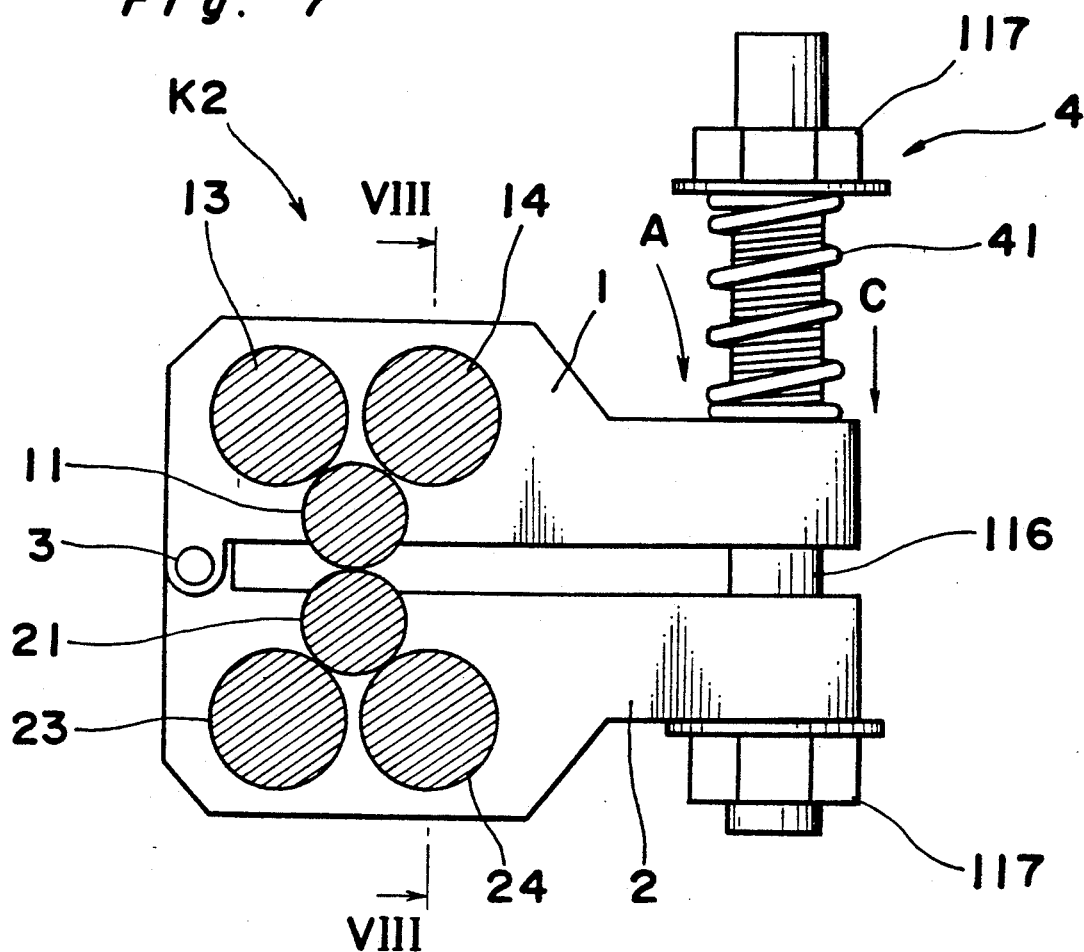
FIG. 7 is a partly sectional front elevational view of a pressure roller device according to a second embodiment of the present invention.
Figure 8:
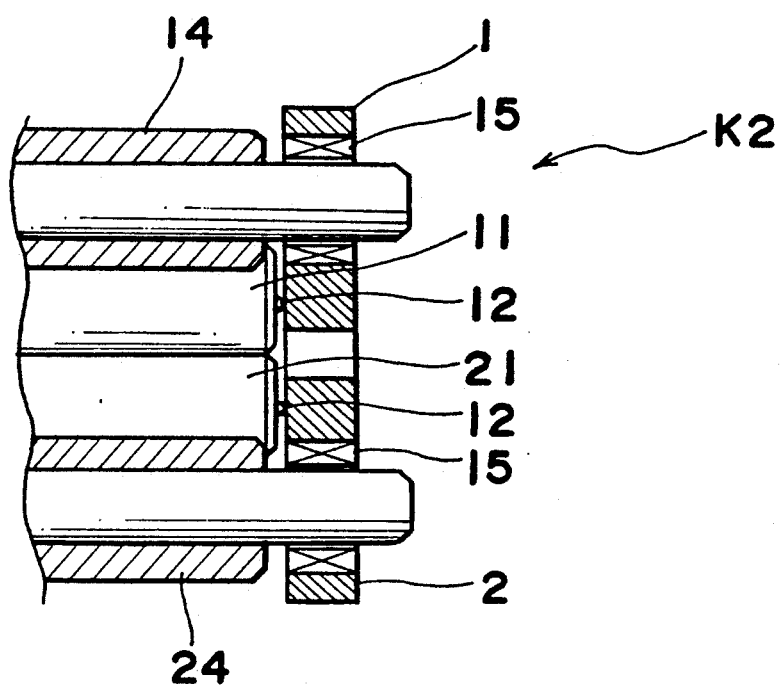
FIG. 8 is a sectional view taken along line VIII—VIII in FIG. 7.

FIGS. 7 and 8 show the pressure roller device K2. The pressure roller device K2 includes the upper and lower pressure rollers 11 and 21, the upper backup rollers 13 and 14 and the lower backup rollers 23 and 24. As shown in FIG. 7, the upper and lower roller holders 1 and 2 are rotatably supported by the hinge 3 provided at one end of the upper and lower roller holders 1 and 2 so as to be rotated relative to each other about the hinge 3, while the pressing mechanism 4 is provided at the other end of the upper and lower roller holders 1 and 2. The pressing mechanism 4 includes a pair of bolts 116 that extends through the upper and lower roller holders 1 and 2. The coiled spring 41 is wound around an upper portion of each of the bolts 116 and a pair of nuts 117 are screwed on upper and lower end portions of each of the bolts 116, respectively such that the coiled spring 41 is pressed between the upper bolt 117 and an upper face of the upper roller holder 1. Thus, an elastic force of the coiled spring 41 is applied in the direction of arrow C, so as to urge the upper roller holder 1 to rotate in the direction of arrow A about the hinge 3 relative to the lower roller holder 2. This rotational force in the direction of arrow A is also applied to the upper backup rollers 13 and 14 supported by the upper roller holder 1, such that the upper backup rollers 13 and 14 downwardly depress the upper pressure roller 11 into pressing contact with the lower pressure roller holder 21.

Meanwhile, when the upper and lower pressure rollers 11 and 21 are set at a diameter of 20 mm, an area of contact between the upper and lower pressure rollers 11 and 21 per unit length in the longitudinal direction of the upper and lower pressure rollers 11 and 21 is reduced as compared with a case in which the upper and lower pressure holders have a diameter of 65 mm, so that pressure per unit area is increased. Thus, a linear pressure can be reduced to 50 to 60 kg/cm.

Figure 10:
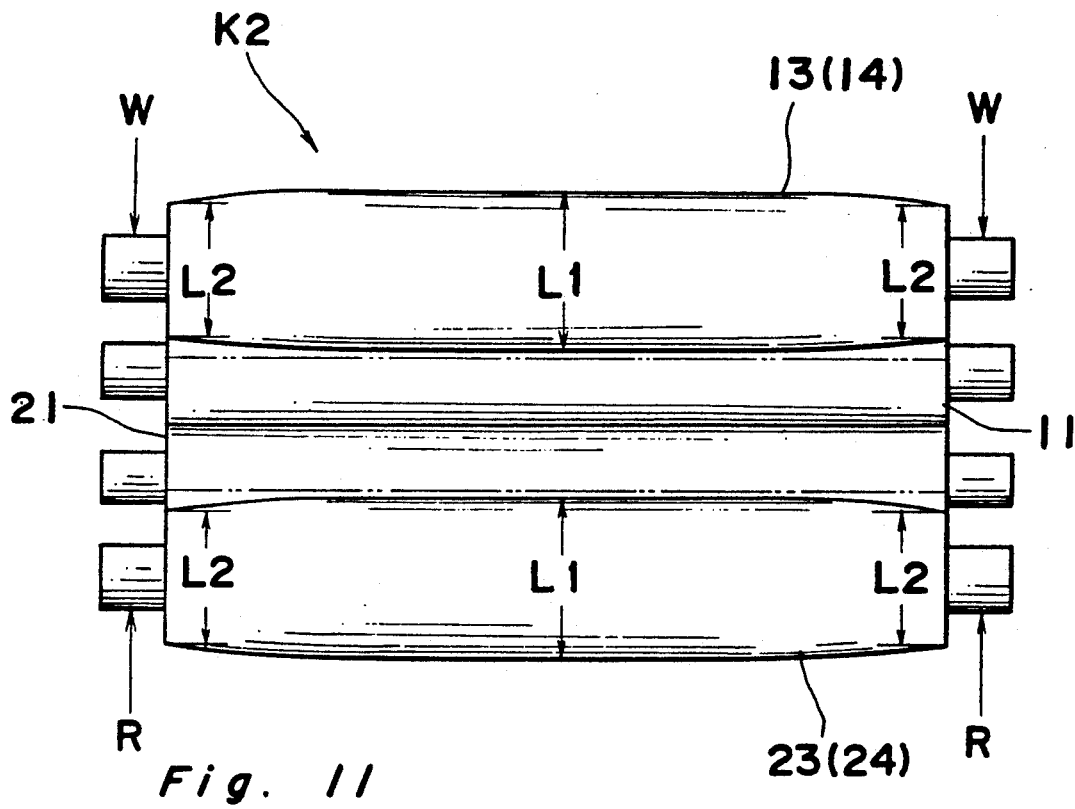
FIG. 10 is a side elevational view of the pressure roller device of FIG. 7.

In FIG. 10, each of the upper backup rollers 13 and 14 gripping the upper pressure roller 11 has diameters L1 and L2 at its longitudinally central portion and at its opposite end portions, respectively, such that diameter L1 is larger than diameter L2. Thus, each of the upper backup rollers 13 and 14 is so shaped as to be crowned at its longitudinally central portion. Likewise, each of the lower backup rollers 23 and 24 has diameters L1 and L2 at its longitudinally central portion and at its opposite end portions, respectively. Assuming that a load W is applied to opposite end portions of the upper backup rollers 13 and 14 by the elastic force of the coiled spring 41, a reaction force R is produced at the opposite end portions of the lower backup rollers 23 and 24. When the load W and the reaction force R are, respectively, applied to the opposite end portions of the upper backup rollers 13 and 14 and the opposite end portions of the lower backup rollers 23 and 24 as described above, a load applied to the upper backup rollers 13 and 14 is so distributed as to become large at the longitudinally central portion but small at the opposite end portions and reaction force applied to the lower backup rollers 23 and 24 is so distributed as to become large at the longitudinally central portion but small at the opposite end portions. Therefore, by properly setting diameters L1 and L2 in accordance with the length of the upper backup rollers 13 and 14 and the lower backup rollers 23 and 24 and value of the load W, a pressing force applied from the upper backup rollers 13 and 14 and the lower backup rollers 23 and 24 to the upper and the lower pressure rollers 11 and 21, respectively, can be made substantially uniform in the longitudinal direction of the upper and lower pressure rollers 11 and 21 at the time of application of the load W and the reaction force R. Namely, the upper backup rollers 13 and 14 and the lower backup rollers 23 and 24, which are of a crowned shape, are deformed substantially linearly, as shown by the two-dot chain lines in FIG. 10, when being held in contact with the upper and lower pressure rollers 11 and 21, respectively. Therefore, contact pressure between the upper and lower pressure rollers 11 and 21 is made substantially uniform in the longitudinal direction of the upper and lower pressure rollers 11 and 21. Thus, since the media sheet 64 and the image receiving sheet 76a or 76b can be pressed against each other by the uniform pressure, the density of the colored image can be made uniform and wrinkling of the sheets can be prevented.

Meanwhile, in the case where the upper and lower pressure rollers 11 and 21 have a length of about 30 cm and a linear pressure of 60 kg/cm is applied between the upper and lower pressure rollers 11 and 21, it seems proper that a difference between the diameters L1 and L2 of the upper backup rollers 13 and 14 and the lower backup rollers 2 and 24, namely a value of (L1-L2) (hereinbelow, referred to as a "crown amount") may assume about 0.05 mm.

Figure 11:
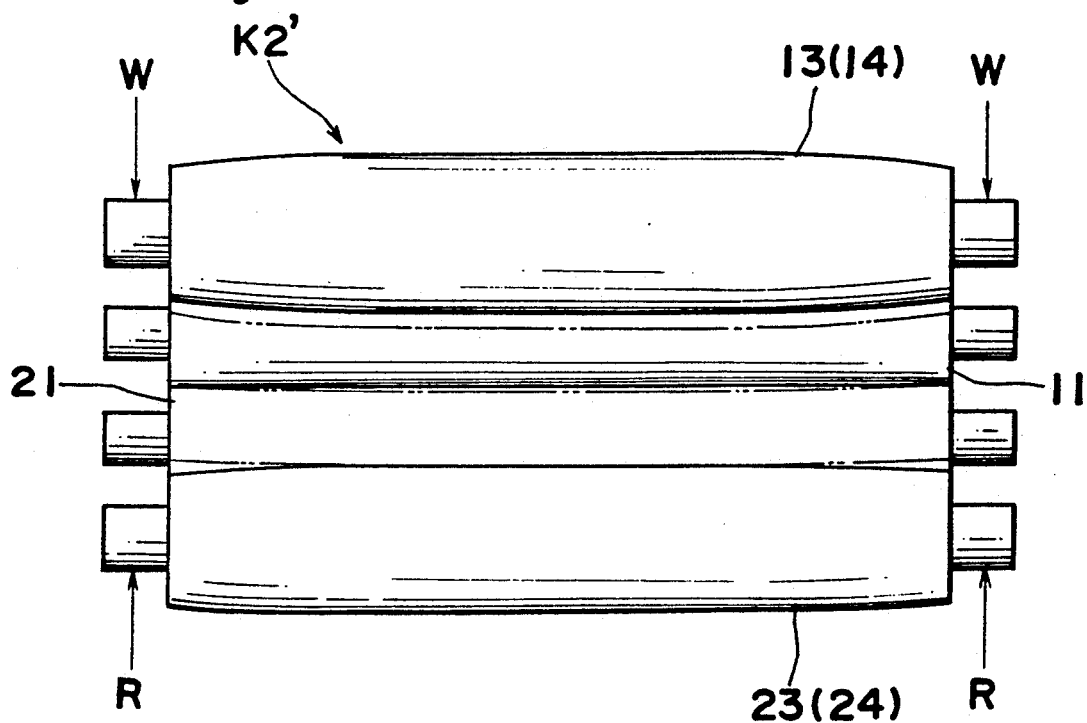
FIGS. 11 and 12 are views similar to FIG. 10, showing first and second modifications thereof, respectively.

Referring to FIG. 11, there is shown a first modification K2' of the pressure roller device K2. In the pressure roller device K2', the crown amount of the upper backup rollers 13 and 14 gripping the upper pressure roller 11, having an angle of its contact with the media sheet 64 larger than an angle of contact of the lower pressure roller 21 with the media sheet 64, is set larger than the crown amount of the lower backup rollers 23 and 24 gripping the lower pressure roller 21. In such an arrangement a ratio of a pressing force applied from the upper backup rollers 13 and 14 to the central portion of the upper pressure roller 11 to a pressing force applied from the upper backup rollers 13 and 14 to the opposite end portions of the upper pressure roller 11 becomes larger than a ratio of a pressing force applied from the lower backup rollers 23 and 24 to the central portion of the lower pressure roller 21 to a pressing force applied from the lower backup rollers 23 and 24 to the opposite end portions of the lower pressure roller 21. Therefore, pressing contact portions of the upper and lower pressure rollers 11 and 21 exhibit a curved line projecting downward, as shown by the two-dot chain lines in FIG. 11. Hence, a tension oriented in the direction from the central portion of the upper and lower pressure rollers 11 and 21 to the opposite end portions of the upper and lower pressure rollers 11 and 21 is applied to the media sheet 64 and the image receiving sheet 76a or 76b. Thus, wrinkling of the sheets can be eliminated.

Figure 12:
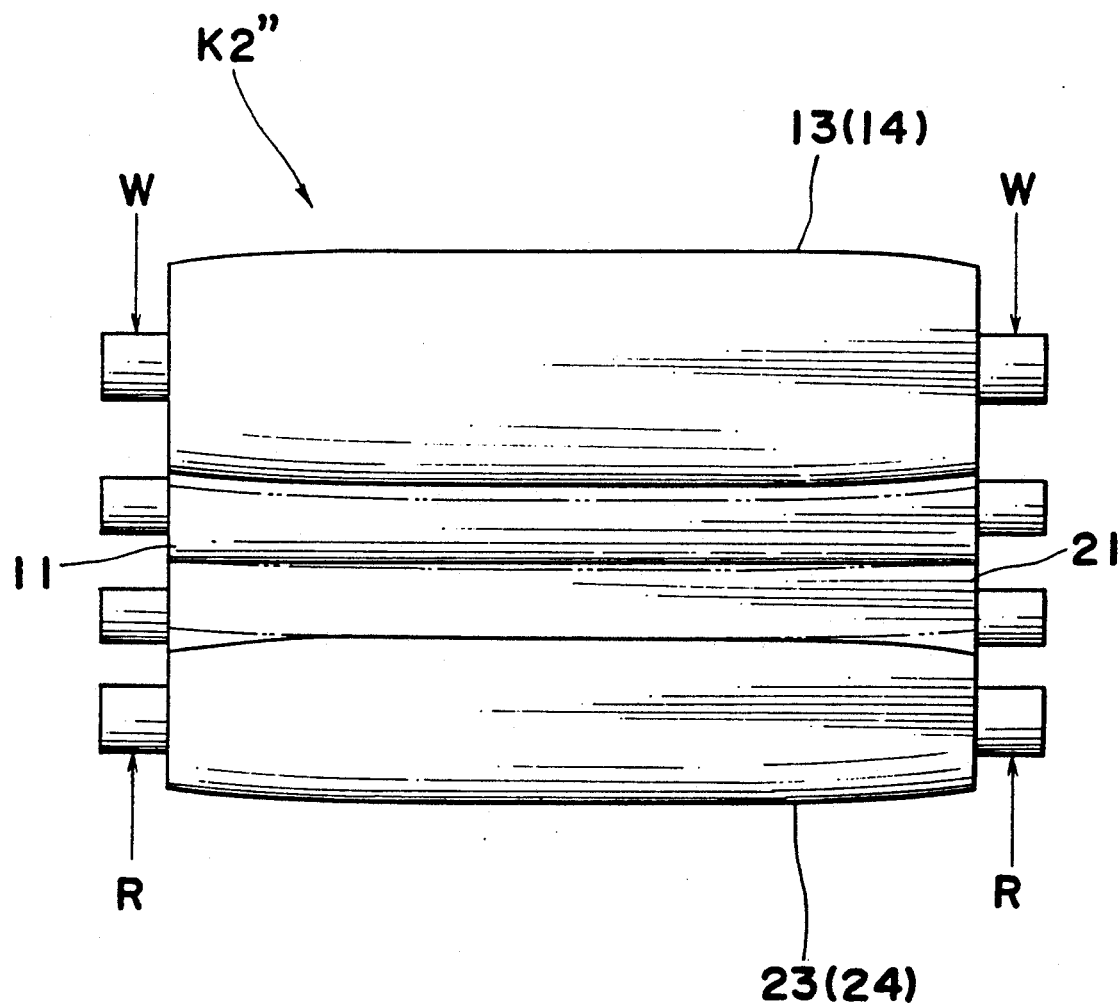

Referring to FIG. 12, there is shown a second modification K2'' of the pressure roller device K2. The above-described functions and effects of the pressure roller device K2' can be similarly obtained in the pressure roller device K2''. In the pressure roller device K2'', the diameter of the upper backup rollers 13 and 14 gripping the upper pressure roller 11 is made larger than the diameter of the lower backup rollers 23 and 24 gripping the lower pressure roller 21.

Meanwhile, in the second embodiment referred to above, the image forming apparatus has been described by way of example. However, it is needless to say that the present invention can also be applied to other apparatuses in which the sheets are pressed in the course of a transport passage of the sheets.

In accordance with the second embodiment of the present invention, nonuniformity of the pressing force from the upper and lower backup rollers to the upper and lower pressure rollers resulting from application of the load to the opposite end portions of the upper and lower backup rollers is eliminated by forming the upper and lower backup rollers into a crowned shape, such that a uniform pressing force is applied from the upper and lower backup rollers to the upper and lower pressure rollers along the longitudinal direction of the upper and lower pressure rollers. Therefore, by preventing the production of a gap between the upper and lower pressure rollers, not only can the density of the colored image be made uniform, but wrinkling of the sheets can be prevented.

Figure 14:
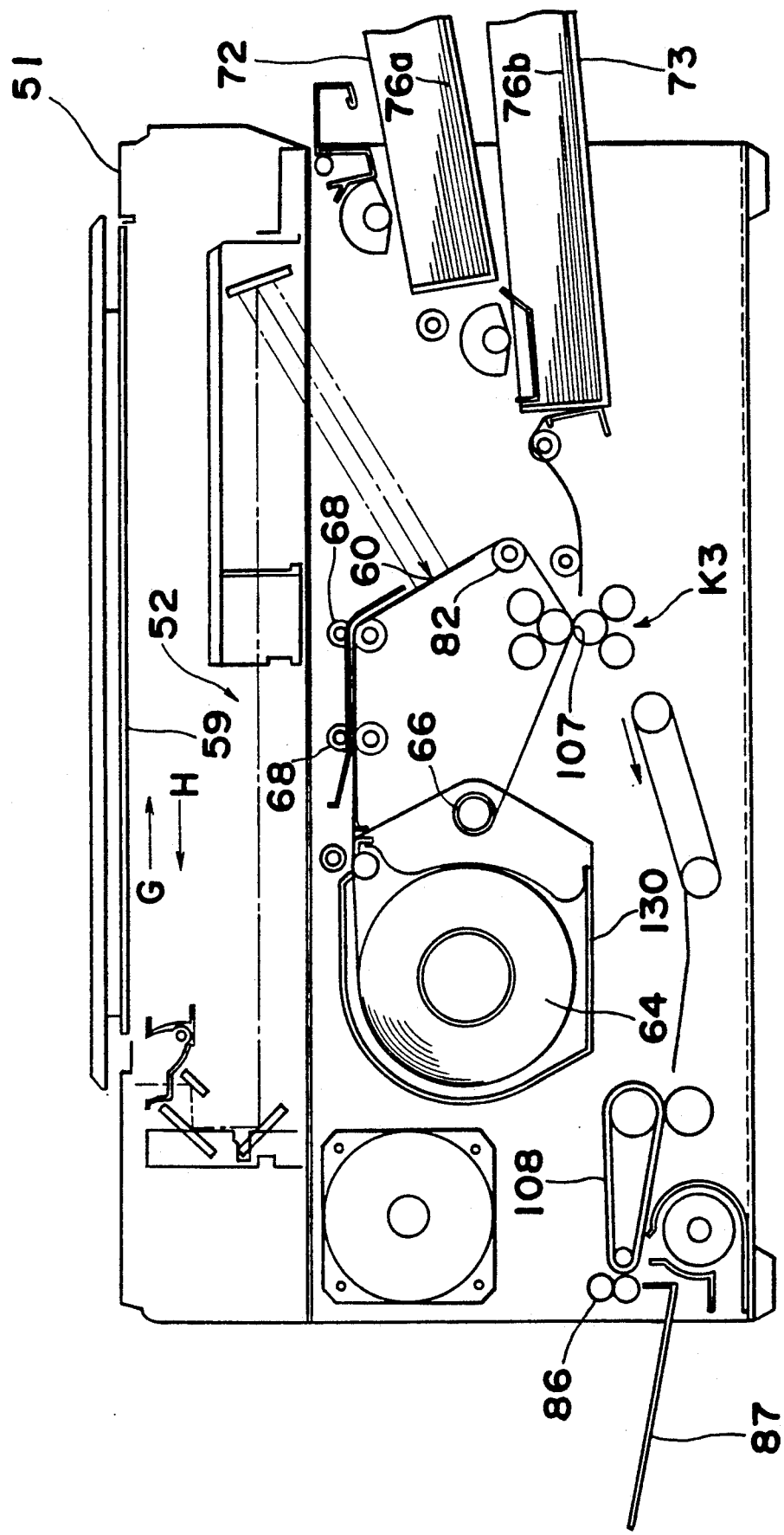
FIG. 14 is a schematic sectional view of a copying apparatus provided with the pressure roller device of FIG. 13.

Referring further to FIG. 14, there is shown a copying apparatus that is provided with a pressure roller device K3 according to a third embodiment of the present invention. The pressure roller device K3 is provided at a substantially central portion of the apparatus housing 51 of the copying apparatus. A cartridge 130, containing the photosensitive and pressure-sensitive media sheet 64, is provided at an upper left portion of the pressure roller device K3. At the exposure portion 60, the media sheet 64 is subjected to exposure by light reflected from an original document, such that a latent image is formed on the media sheet 64. The image receiving sheet 76a or 76b is fed from the first or second paper cassette 72 or 73 at a predetermined timing so as to be carried onto the latent image on the media sheet 64. In this state, the media sheet 64 and the image receiving sheet 76a or 76b are pressed against each other at the pressure transfer portion 107, such that an image is formed on the image receiving sheet 76a or 76b.

Figure 13:
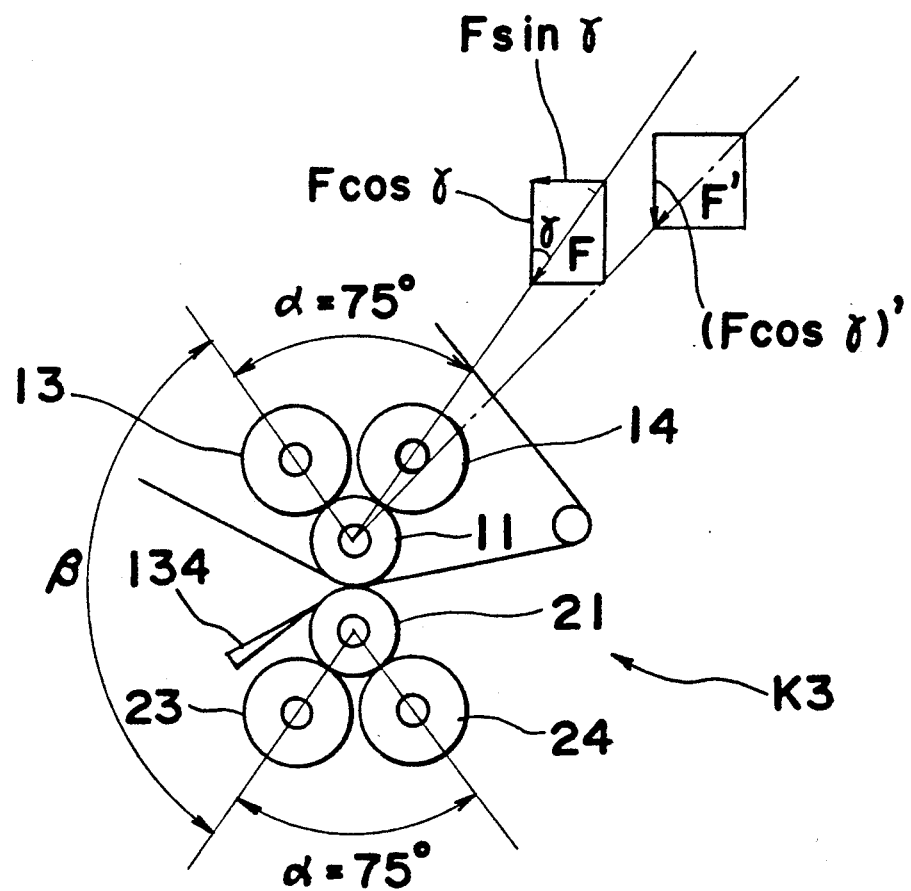
FIG. 13 is a schematic front elevational view of a pressure roller device according to a third embodiment of the present invention.

Referring to FIG. 13, the pressure roller device K3 is shown. In the pressure roller device K3, the upper and lower pressure rollers 11 and 21 have a diameter of about 30 mm, while the upper backup roller 13 and 14 and the lower backup rollers 23 and 24 have a diameter of about 40 mm. An angle $\alpha$ formed from the center of the upper pressure roller 11 by the centers of the upper backup rollers 13 and 14, is set at about 75°. Likewise, the centers of the lower backup rollers 23 and 24 form the angle $\alpha$ of about 75° from the center of the lower backup roller 21. Although not specifically shown, a drive unit is coupled with the upper backup roller 14 and the lower backup roller 24 so as to transmit a driving force to the upper backup roller 14 and the lower backup roller 24, such that the upper and lower pressure rollers 11 and 21 are rotated.

In FIG. 13, character F denotes a force applied to the pressure roller by the backup roller and character 7 denotes an angle formed by a direction of pressing contact of the pressure rollers and a direction of pressing of the pressure roller by the backup roller. When the angle $\alpha$ is set so as to be not more than 90°, for example, 75° as described above, a pressing contact force of F cos$\tau$ of the pressure rollers becomes larger than a pressing contact force (F cos$\tau$)' of the pressure rollers obtained at the time when the angle $\alpha$ is set at 90°.

By setting the angle $\alpha$ at not more than 90°, an angle $\beta$ formed between a line connecting the centers of the upper backup roller 13 and the upper pressure roller 11 and a line connecting the centers of the lower pressure roller 21 and the lower backup roller 23, becomes large. Therefore the, feed angle of the media sheet 64 from the pressure roller device K3 to the take-up shaft 66 can be made large, so that the media sheet 64 can be efficiently separated from the image receiving sheet 76a or 76b. Furthermore, since a separation claw 134, for separating the image receiving sheet 76a or 76b from the lower pressure roller 21, can be brought into contact with the surface of the lower pressure roller 21 at an acute angle, the image receiving sheet 76a or 76b can be efficiently separated from the lower pressure roller 21.

As will be seen from the foregoing, in the third embodiment of the present invention, the large pressing contact force can be applied to the pressure rollers by the backup rollers of a small diameter, so that the pressure roller device can be made compact in size and the production cost of the pressure roller device can be reduced.

Meanwhile, the distance between the upper backup rollers and the lower backup rollers is increased. Therefore, since the feed angle of the media sheet from the pressure roller device to the take-up shaft can be increased, the media sheet can be efficiently separated from the image receiving sheet. Furthermore, since the separation claw for separating the image receiving sheet from the lower pressure roller can be brought into contact with the surface of the lower pressure roller at an acute angle, the image receiving sheet can also be efficiently separated from the lower pressure roller.

Although the present invention has been fully described by way of example with reference to the accompanying drawings, it is to be noted here that various changes and modifications will be apparent to those skilled in the art. Therefore, unless such changes and modifications depart from the scope of the present invention, they should be construed as being included herein.

What is claimed is:

1. A pressure roller device, comprising:
    upper and lower roller holders, each roller holder having a recess in an opposite end face thereof;
    upper and lower pressure rollers that are supported by said upper and lower roller holders, respectively, each pressure roller having a recess in an opposite end face so that a bearing is placeable in said recess formed in each respective pressure roller and respective roller holder so as to permit a free state rotation of said upper and lower pressure rollers, each recess in said upper and lower roller holders being larger than a diameter of said bearing, so that said upper and lower pressure rollers can move in a radial direction;
    a pair of upper backup rollers and a pair of lower backup rollers which are, respectively, provided at upper and lower sides of said upper and lower pressure rollers remote from a point of contact of said upper and lower pressure rollers, so as to be rotatably supported by said upper and lower roller holders, respectively, said pair of upper backup rollers and said pair of lower backup rollers being larger in diameter than said upper and lower pressure rollers;
    said upper roller holder being rotatably supported, at one end of said upper and lower roller holders, by said lower roller holder; and
    a pressing mechanism for pressing said upper roller holder against said lower roller holder, said pressing mechanism being provided at he other end of said upper and lower roller holders;

wherein said upper roller holder is rotated so as to be pressed against said lower roller holder, such that said upper and lower pressure rollers are brought into pressing contact with each other by said pair of upper backup rollers and said pair of lower backup rollers, said pair of upper backup rollers and pair of lower backup rollers exerting a uniform pressure upon said upper and lower pressure rollers along a longitudinal direction of said upper and lower pressure rollers, such that said pair of upper backup rollers and pair of lower backup rollers are brought into pressing contact with said upper and lower pressure rollers along the overall length of said upper and lower pressure rollers.

2. The pressure roller device of claim 1, wherein said diameter of said upper and lower pressure rollers is 20 mm.

3. A pressure roller device, comprising:

first and second pressure rollers which are hold in contact with each other so as to press a sheet therebetween such that a contact angle of said first pressure roller with said sheet is larger than that of said second pressure roller with said sheet, each end face of each pressure roller having a recess formed therein;

a first pair of horizontally positioned backup rollers that grip said first pressure roller at opposite sides of said first pressure roller at a point remote from a point of contact of said pressure rollers;

a second pair of horizontally positioned backup rollers that grip said second pressure roller at opposite sides of said second pressure roller at a point remote from said point of contact of said pressure rollers;

an urging member for urging said first and second pair of backup rollers in a direction for bringing said pair of pressure rollers into contact with each other, said first and second pressure rollers being supported by a bearing that is positioned in each recess in said first and second pressure rollers and which engages corresponding recesses in said urging member so as to permit a free state rotation of said first and second pressure rollers, said recesses in said urging member being larger than a diameter of said bearing, so that said first and second pressure rollers can move in a radial direction;

wherein said pair of pressure rollers have a circumference that is smaller than a circumference of said first and second pair of backup rollers, at least said first pair of backup rollers being shaped so as to have a circumference at a longitudinally central portion thereof that is larger than a circumference of said first pair of backup rollers at opposite end portions thereof, so that at least said first pair of backup rollers exert a uniform pressure upon said pair of pressure rollers along a longitudinal direction of said pair of pressure rollers, said first pair of backup rollers being brought into pressing contact with said pair of pressure rollers along the overall length of said pair of pressure rollers.

4. The pressure roller device of claim 3, wherein when said pair of pressure rollers have a length of about 30 cm, the difference between the diameters of said longitudinally central portion and said opposite end portions of said first pair of backup rollers is about 0.05 mm.

5. A pressure roller device, comprising:

upper and lower pressure rollers which are held in contact with each other, each end face of said upper and lower pressure rollers having a recess formed therein;

a pair of horizontally positioned upper backup rollers which grip said upper pressure roller along an axial direction of said upper pressure roller at opposite upper sides of said upper pressure roller at a point remote from a point of contact of said upper and lower pressure rollers;

a pair of horizontally positioned lower backup rollers which grip said lower pressure roller along an axial direction of said lower pressure roller at opposite lower sides of said lower pressure roller at a point remote from said point of contact of said upper and lower pressure rollers; and a pressing mechanism for pressing said upper and lower backup rollers towards centers of said upper and lower pressure rollers, respectively, said upper and lower pressure rollers being supported by a bearing that is positioned in each recess in said upper and lower pressure rollers and which engages corresponding recesses in said pressing member so as to permit a free state rotation of said upper and lower pressure rollers, said recesses in said pressing mechanism being larger than a diameter of said bearing, so that said upper and lower pressure rollers can move in a radial direction;

wherein said pair of upper backup rollers and said pair of lower backup rollers form an angle with respect to said centers of said upper and lower pressure rollers, respectively, such that said angle is set at not more than 90°, a diameter of said upper and lower pressure rollers being smaller than a diameter of said upper and lower backup rollers.

6. The pressure roller device of claim 5, wherein said angle is 75°.

7. The pressure roller device of claim 5, wherein a uniform pressure is applied between said upper and lower backup rollers and said upper and lower pressure rollers along a longitudinal direction of said pressure rollers.

8. A pressure roller device, comprising:

a pair of roller holders;

a pair of pressure rollers, each end face of each pressure roller having a recess formed therein for receiving a bearing that also engages a complementary recess formed in said pair of roller holders so that said pair of pressure rollers are supported by said pair of roller holders in a free rotation state, each recess in said pair of roller holders being larger than a diameter of said bearing, so that said pair of pressure rollers can move in a radial direction;

a pair of backup rollers which are provided proximate said pair of pressure rollers at a point that is remote from a contact point of said pair of pressure rollers, so as to be rotatably supported by said pair of roller holders, one roller holder being rotatably supported at one end of said pair of roller holders by the remaining roller holder, a diameter of said pair of pressure rollers being smaller than a diameter of said pair of backup rollers; and means for pressing one roller holder against said one roller holder, said pressing means being provided at one end of said pair of roller holders, wherein one roller holder is rotated so as to be pressed against the remaining roller holder, such that said pair of pressure rollers are brought into pressing contact with each other by said pair of backup rollers, said pair of backup rollers exerting a uniform pressure upon said pair of pressure rollers along a longitudinal direction of said pair of pressure rollers, such that at least one backup roller is brought into pressing contact with said pair of pressure rollers along the overall length of said pair of pressure rollers.

9. The pressure roller device of claim 8, wherein said pressing means comprises a pressing mechanism.

10. A pressure roller device, comprising:
upper and lower roller holders;
upper and lower pressure rollers, said upper and lower pressure rollers having end faces that have a recess formed therein;
first means for rotatably supporting said pressure rollers against said roller holders, said first supporting means having a recess formed therein that complements said recesses formed in said upper and lower pressure rollers, a bearing being positionable between each recess in said first supporting means and said upper and lower pressure rollers so that said pair of pressure rollers are supported in a free rotation state, each recess in said first supporting means being larger than a diameter of said bearing, so that said upper and lower pressure rollers can move in a radial direction;
a pair of horizontally positioned upper backup rollers, said pair of upper backup rollers being positioned at opposite upper sides of said upper pressure roller, a diameter of said pair of upper backup rollers being larger than a diameter of said upper pressure roller;
a pair of horizontally positioned lower backup rollers, said pair of lower backup rollers being positioned at opposite lower sides of said lower pressure roller, a diameter of said pair of lower backup rollers being larger than a diameter of said lower pressure roller;

second supporting means for rotatably supporting said backup rollers against said roller holders;
means for bringing said pairs of upper and lower backup rollers into pressing contact with said respective upper and lower pressure rollers, said pairs of upper and lower backup rollers exerting a uniform pressure upon said respective upper and lower pressure rollers along a longitudinal direction of said upper and lower pressure rollers, such that said pairs of upper and lower backup rollers are brought into pressing contact with said respective upper and lower pressure rollers along the overall length of said upper and lower pressure rollers, while said first and second supporting means absorbs any excess pressing force that may occur from said pairs of upper and lower backup rollers pressing said respective upper and lower pressure rollers.

11. The pressure roller device of claim 10, wherein said first supporting means comprises a ball bearing that engages a recess on an end face of said upper and lower pressure rollers and an inner side face of said upper and lower roller holders, said upper and lower pressure rollers being rotatably supported by a point of said ball.

12. The pressure roller device of claim 10, wherein said second supporting means comprises a needle bearing.

13. The pressure roller device of claim 10, wherein said pressing contact means comprises:
a spring that is provided at an end portion of said upper and lower roller holders; and
means for tensioning said spring so as to bring said upper and lower roller holders towards each other.

14. The pressure roller device of claim 13, wherein said tensioning device comprises a bolt that passes through said spring and a nut that engages said bolt to compress said spring.

15. The pressure roller device of claim 10, wherein said diameter of said upper and lower pressure rollers is 20 mm.

* * * * *

UNITED STATES PATENT AND TRADEMARK OFFICE
CERTIFICATE OF CORRECTION

PATENT NO. : 5,080,010
DATED : January 14, 1992
INVENTOR(S) : Y. IBUCHI ET AL

It is certified that error appears in the above-indentified patent and that said Letters Patent is hereby corrected as shown below:

On the title page, before "[30] Foreign Application Priority Data" insert ---Related U.S.Application Data-- and on the next line insert --[63] Continuation of Serial No. 07/401,850, filed on September 1, 1989--.

In claim 1, line 30, change "he" to ---the---.

Signed and Sealed this

Twenty-sixth Day of October, 1993

Attest:

BRUCE LEHMAN

Attesting Officer

Commissioner of Patents and Trademarks